(12) United States Patent
Steele

(10) Patent No.: US 9,151,688 B2
(45) Date of Patent: Oct. 6, 2015

(54) APPARATUS AND METHOD FOR DETERMINING PACKAGE INTEGRITY FOR POROUS AND NON-POROUS PACKAGES

(71) Applicant: Matthew D. Steele, Oshkosh, WI (US)

(72) Inventor: Matthew D. Steele, Oshkosh, WI (US)

( * ) Notice: Subject to any disclaimer, the term of this patent is extended or adjusted under 35 U.S.C. 154(b) by 249 days.

(21) Appl. No.: 13/756,235

(22) Filed: Jan. 31, 2013

(65) Prior Publication Data
US 2013/0192346 A1     Aug. 1, 2013

Related U.S. Application Data

(60) Provisional application No. 61/592,735, filed on Jan. 31, 2012.

(51) Int. Cl.
*G01M 3/00* (2006.01)
*G01M 3/32* (2006.01)

(52) U.S. Cl.
CPC .............. *G01M 3/00* (2013.01); *G01M 3/3254* (2013.01); *G01M 3/3272* (2013.01)

(58) Field of Classification Search
CPC .... G01M 3/00; G01M 3/3236; G01M 3/3254
USPC ........................................................ 73/49.3
See application file for complete search history.

(56) References Cited

U.S. PATENT DOCUMENTS

| | | | |
|---|---|---|---|
| 4,205,551 A * | 6/1980 | Clifford et al. ................... 73/52 |
| 4,398,413 A * | 8/1983 | Rao ................................ 73/40.7 |
| 4,459,843 A | 7/1984 | Durham |
| 4,539,836 A | 9/1985 | Hester et al. |
| 4,733,555 A | 3/1988 | Franks |
| 4,837,707 A | 6/1989 | Giometti et al. |
| 4,916,936 A | 4/1990 | Wilson |
| 4,930,344 A * | 6/1990 | Fleenor et al. ................ 73/49.3 |
| 5,212,993 A * | 5/1993 | Mayer ....................... 73/864.21 |
| 5,347,845 A * | 9/1994 | Kepler ......................... 73/31.03 |
| 5,939,619 A * | 8/1999 | Achter et al. .................. 73/40.7 |
| 6,038,915 A | 3/2000 | O'Herron et al. |
| 6,065,133 A * | 5/2000 | Draber .............................. 714/1 |
| 6,640,614 B1 | 11/2003 | Bode et al. |
| 7,578,170 B2 * | 8/2009 | Mayer et al. .................. 73/49.3 |
| 7,624,623 B2 * | 12/2009 | Mayer et al. .................. 73/49.3 |
| 7,810,377 B2 | 10/2010 | Gysi et al. |
| 7,921,625 B1 * | 4/2011 | Mayer ............................ 53/434 |
| 2007/0289390 A1 * | 12/2007 | Ascheman ...................... 73/861 |

* cited by examiner

*Primary Examiner* — Daniel S Larkin
(74) *Attorney, Agent, or Firm* — Morriss O'Bryant Compagni

(57) ABSTRACT

A package testing system or apparatus that may be mounted directly onto an F/F/S machine and allows for communication with an F/F/S machine in the form of either a digital or analog signal. The communication may be implemented into a PID loop which allows for a predetermined burst pressure set point to be reached "automatically" by either the burst pressure controller or the F/F/S controller to automatically adjust the sealing parameters via the PID loop. The system may employ a novel sealing system that uses either a viscous solution or a series of laminated materials to seal either the needle entry point or the puncture side of the material in its entirety, thereby eliminating the use of known sealing patches that cover the porous webbing in testing. Methods for conducting such testing and for operating such systems are within the scope of the present disclosure.

15 Claims, 7 Drawing Sheets

APPARATUS AND METHOD FOR DETERMINING PACKAGE INTEGRITY FOR POROUS AND NON-POROUS PACKAGES

CROSS-REFERENCE TO RELATED APPLICATION

This application claims the benefit of U.S. Provisional Application No. 61/592,735, filed Jan. 31, 2012, the disclosure of which is incorporated herein by reference in its entirety.

TECHNICAL FIELD

The present disclosure relates to package integrity testing apparatus and methods and more specifically to apparatus and methods for testing package integrity that are capable of testing porous packages.

BACKGROUND

Medical devices are commonly packaged by form fill seal or F/F/S machines to place the devices in packages in which they can be sterilized and the sterilization maintained until usage. In order to verify the package integrity, a subset of packages from each batch processed by a machine are typically pulled and subject to testing for seal completeness. For packages made of a non-porous material, such tests are typically burst tests in which a needle is used to pressurize the package until the seal or package ruptures. Properly sealed packages will require at least a known pressure before bursting. However, for packages with a porous portion, such as a plastic package with a paper top, such burst testing does not work as the injected air flows through the porous portion of the package. Prior art attempts to address this issue by utilizing a sealing patch that is manually applied to the packaging web area that is to be punctured. However, such a seal can mask issues with the web area, for example holes in the porous portion that are covered by the seal, but which would represent a breach of the package integrity.

Some examples of known testing devices include those disclosed in the following U.S. Pat. No. 7,810,377, U.S. Pat. No. 6,640,614, U.S. Pat. No. 4,916,936, U.S. Pat. No. 4,459,843, U.S. Pat. No. 6,038,915, U.S. Pat. No. 4,539,836, U.S. Pat. No. 4,837,707, and U.S. Pat. No. 4,733,555, the contents of each of which are incorporated by reference herein in their entirety. However, current package burst test technology does not provide a reliable method for testing different types of packages directly on the F/F/S machine. Testing devices or methods that addressed these various shortcomings would be an improvement in the art.

SUMMARY

The present disclosure includes a package testing apparatus that may be mounted directly onto an F/F/S machine. The apparatus allows for communication with an F/F/S machine in the form of either a digital or analog signal. The communication may be implemented into a PID (Proportional, Integral, Derivative) loop which allows for a predetermined burst pressure set point to be reached "automatically" by either the burst pressure controller or the F/F/S controller to automatically adjust the sealing parameters via the PID loop. This apparatus may employ a novel sealing system that uses either a viscous solution to seal the needle entry point or a series of laminated materials to seal either the needle entry point or the puncture side of the material in its entirety. This apparatus greatly reduces the time for each test by eliminating the use of the known sealing patches that cover the porous webbing whether "offline" or "in-line" in testing.

Methods for conducting such testing, methods for operating such devices and systems including such devices are also as part of the present disclosure. Commercial applications of the methods, systems, and devices in accordance with the present disclosure may include offline, in-line, flexible, rigid, porous, and non-porous packaging. The application may be implemented on any packaging sealing machine.

DESCRIPTION OF THE DRAWINGS

It will be appreciated by those of ordinary skill in the art that the various drawings are for illustrative purposes only. The nature of the present disclosure, as well as various embodiments, may be more clearly understood by reference to the following detailed description, to the appended claims, and to the several drawings.

DETAILED DESCRIPTION

The present disclosure relates to systems and methods for testing package integrity. It will be appreciated by those skilled in the art that the embodiments herein described, while illustrative, are not intended to so limit the scope of the appended claims. Those skilled in the art will also understand that various combinations or modifications of the embodiments discussed herein can be made without departing from the scope of this disclosure. All such alternate embodiments are within the scope of the appended claims.

Figure 1:
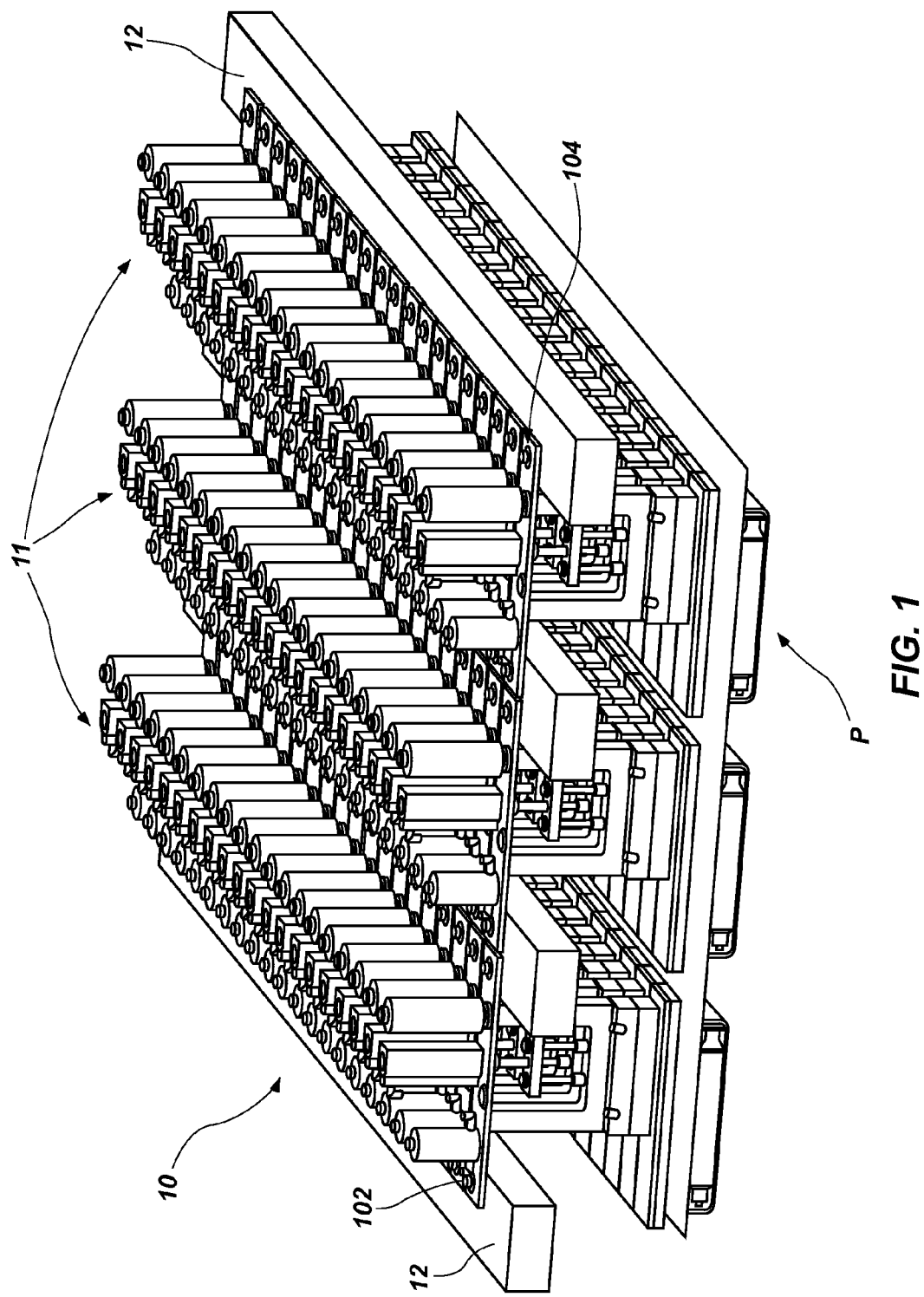
FIG. 1 is a perspective view of a modular testing system in accordance with the principles of the present invention.

Referring to FIG. 1, a modular testing apparatus 10 in accordance with the present invention is depicted. The modular testing apparatus 10 may be positioned at the end of an F/F/S machine allowing it to be actuated and test packages coming directly off the machine as may be desired. For example, at periodic intervals, such as every tenth cycles on the F/F/S machine (or other intervals as may be desired or required by an application), the modular testing apparatus 10 may be actuated to perform in-line testing of packages as they are produced.

A number of individual modular testing units 20 are organized into one or more rows 11. A framework 12 supports a number of individual modular testing units 20 in each row 11. The individual units 20 may be attached to the framework 12 by set screws or bolts 102 passing through one or more attachment slots 104, allowing for adjustment of the position of the units 20. It will be appreciated that for certain embodiments, only a single row 11 of individual modular testing units 20 may be used and will vary upon the particular F/F/S machine with which the system 10 will be used. The framework 12 may be positioned to the individual modular units 20 to test individual packages P as they emerge from a F/F/S machine.

Figure 2A:
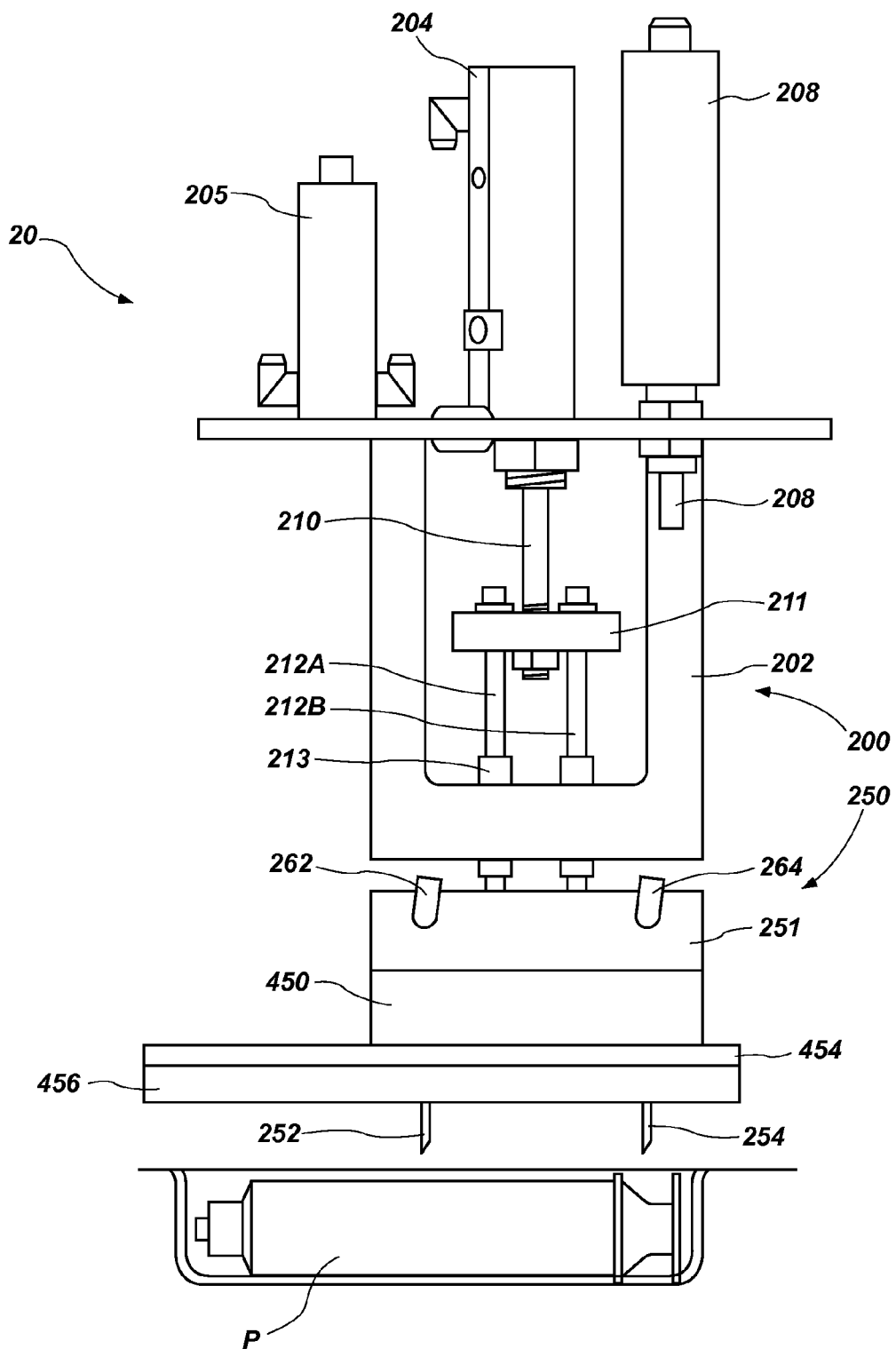
FIGS. 2A and 2B are side and front views of a modular testing unit of the system of FIG. 1.
Figure 2B:
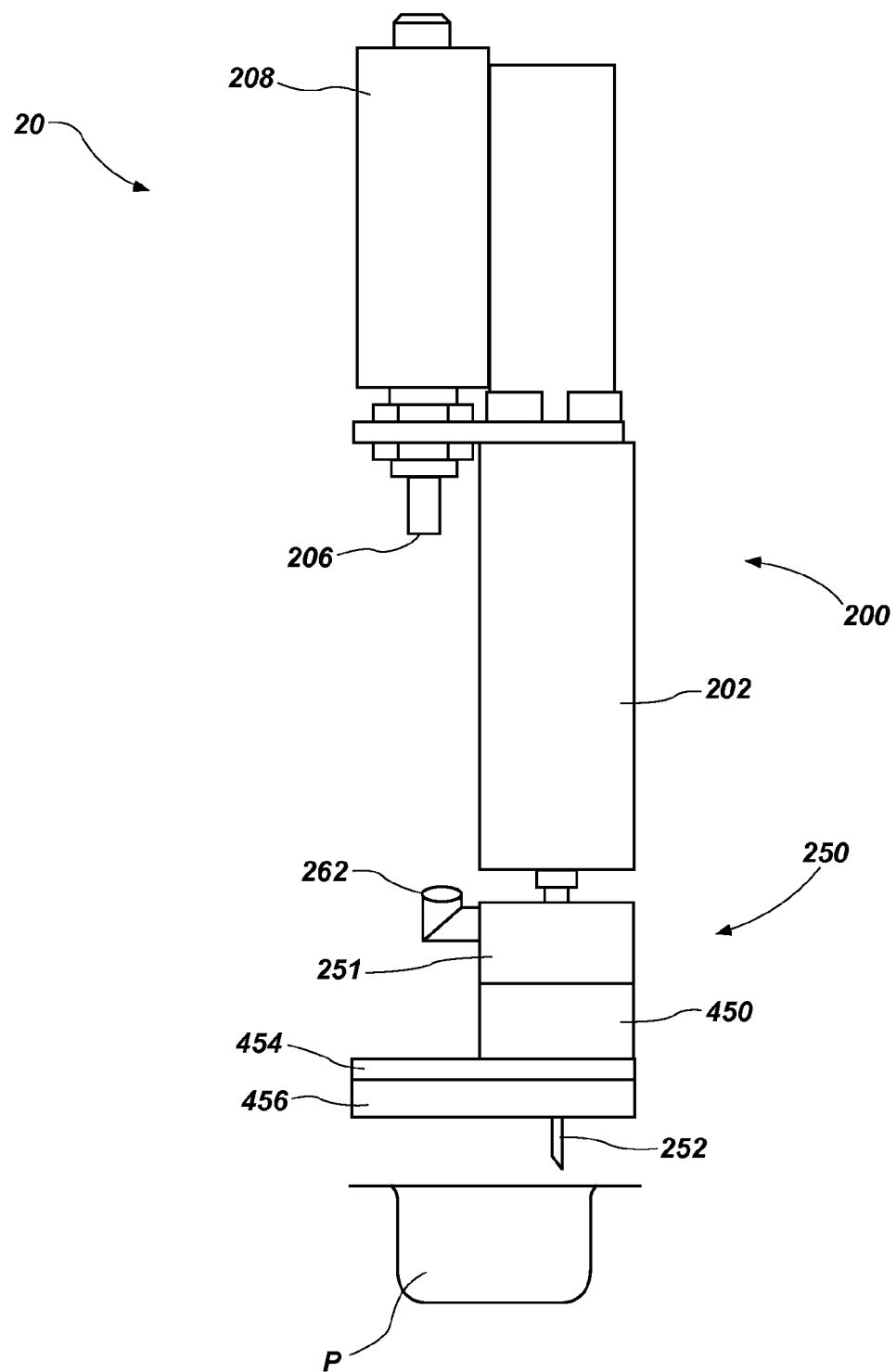
Figure 3:
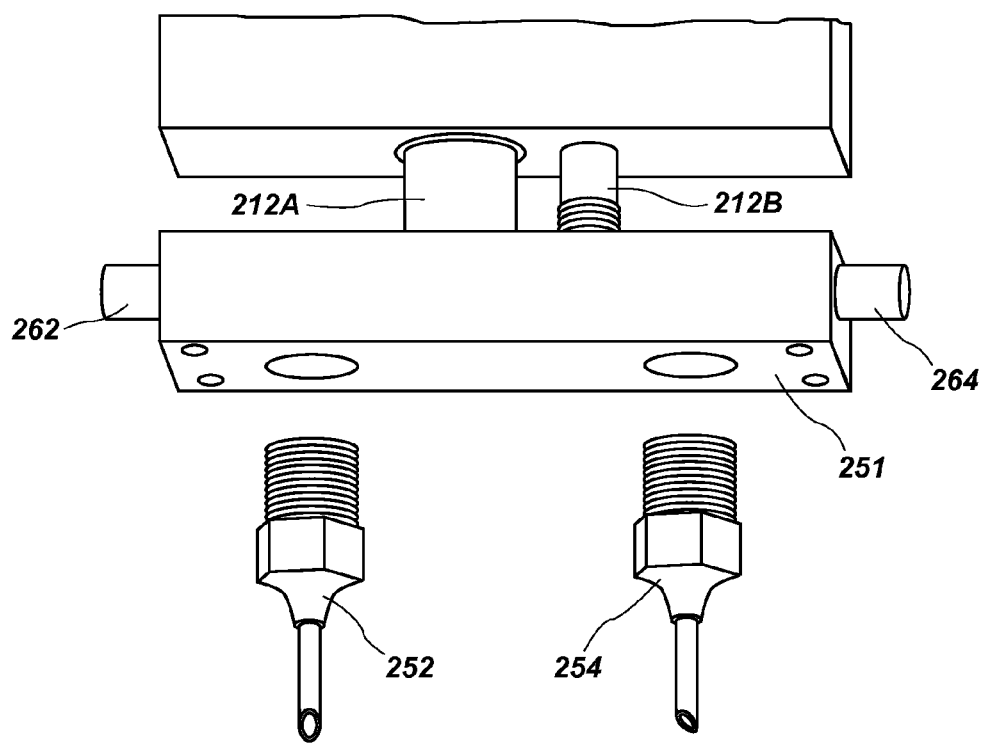
FIG. 3 is a partially exploded view of a lower assembly of another modular testing unit in accordance with the principles of the present disclosure.

An individual modular testing unit 20 is depicted in isolation from the row 11 in FIGS. 2A and 2B with a package P placed in the proper position for conducting a test. The individual modular testing unit 20 includes an upper assembly 200 and a lower assembly 250. Upper assembly 200 includes a frame 202 in which a linear actuator 204 is disposed. An upper linear shaft 210 is connected by an intermediate plate 211 to two lower linear shafts 212A and 212B which extend from the upper assembly 200 to lower assembly 250 through the frame 202 lower end. The two lower linear shafts 212A and 212B may pass through bearing assemblies 213 in frame 202 to facilitate movement. Upon actuation by the linear actuator 204 the shafts 212A and 212B are extended or retracted to lower or raise the lower assembly 250. It will be appreciated that while as depicted, the two lower shafts 212A and 212B may extend from intermediate plate 211 to which the actuator is linked by upper linear shaft 210, that in alternate embodiments, more or fewer shafts may be used and intermediate plate 210 may be omitted or varied as required. It will be further appreciated that in some embodiments the shafts 212A and 212B may vary in size, as depicted in FIGS. 3 and 4B.

A pressure transducer 208 may be disposed on the upper assembly 200 and a connection 206 thereto may similarly be disposed with a connecting line therebetween. It will be appreciated that in some embodiments a single transducer may be used to which all the modular units 20 in a row or all the modular units 20 in a system 10 may be connected, depending on the desired installation.

A solenoid valve 205 may also be present and in communication with an air source, the pressure transducer 208, and/or the needles. The type of solenoid valve may vary based on desired use, as discussed further herein. In some instances, a three-way solenoid valve may be used.

Figure 4A:
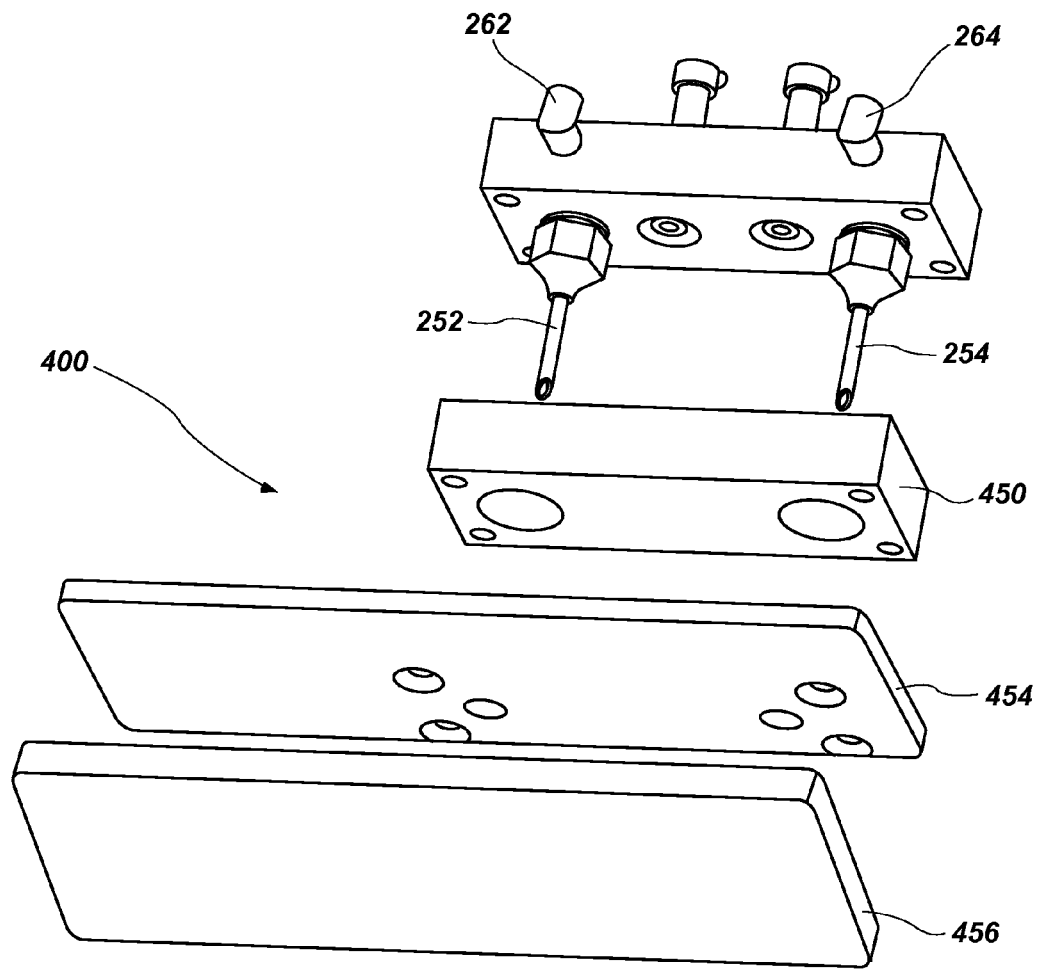
FIGS. 4A and 4B are exploded views of two embodiments of bottom sealing units for attachment to the lower assemblies of FIGS. 2 and 3, respectively.
Figure 4B:
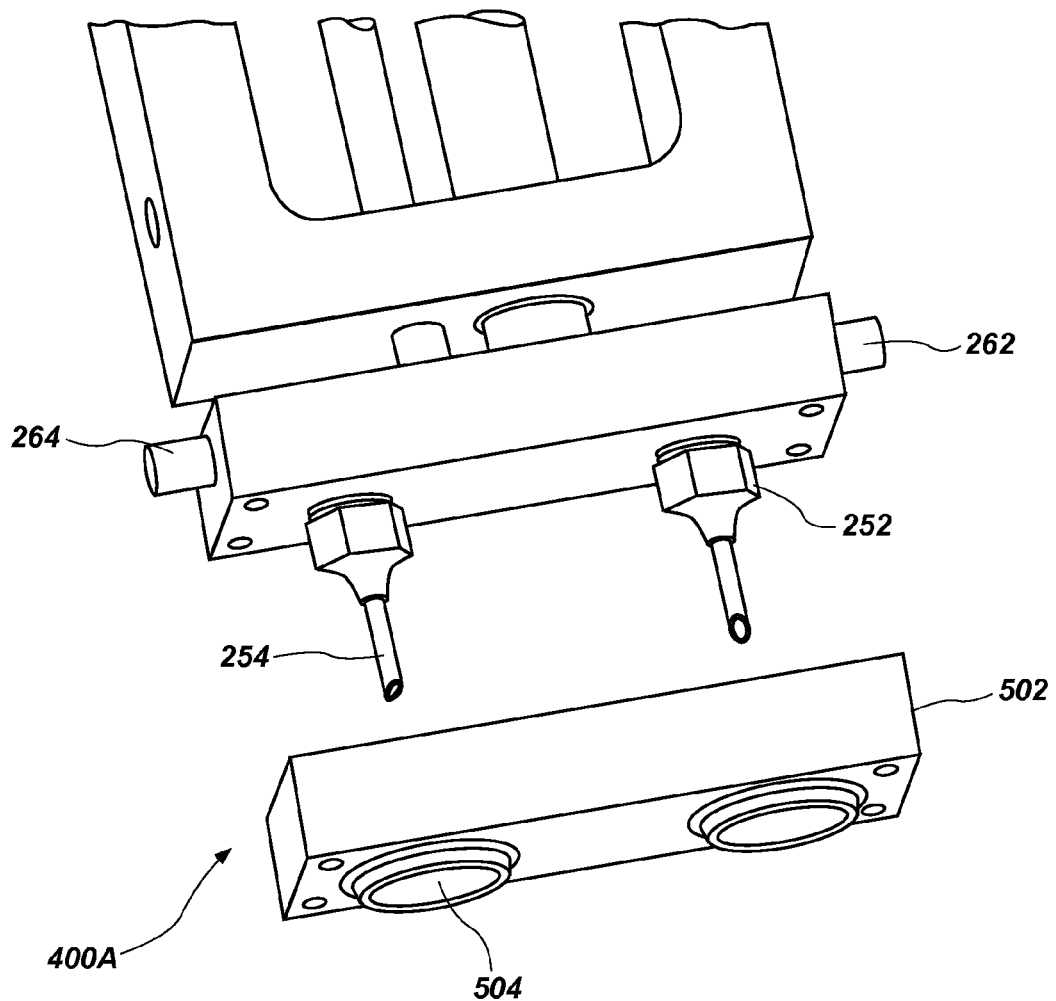

The lower assembly 250 is depicted more clearly in FIGS. 4A and 4B include a needle block manifold 251 in which hollow needles 252 and 254 are installed. The needles may be threaded to allow for ready replacement. Each needle is in communication with a line allowing a gas such as air to pass therethrough, as indicated by fittings 264 and 262 for connecting to external lines. One needle 254 is connected to a source of gas via fitting 264 and the other needle 252 to the pressure transducer 208 through fitting 262. For clarity, a line between fitting 262 and the corresponding fitting 206 on the pressure transducer has been omitted from the drawings, but it will be appreciated that any suitable tubing may be used. It is noted that the different embodiments of 3A and 3B reflect different locations on needle block manifold 251 for the fittings 264 and 262, which may vary based on design for a particular use.

As depicted in FIG. 4A and lower assembly 250 includes a sealing structure 400 for making a sealing connection to the surface of a package, which may be formed from a number of layers. In the depicted embodiment, a spacer block 450 is attached to the needle block manifold 251 and allows the needles 252 and 254 to pass though apertures therein. A foam backer 454, such as a compressible foam layer, is disposed under spacer block 450 and a seal material 456, such as silicone or rubber mat or sealing foam is used to form a bottom seal. When the modular testing unit 20 is actuated, the seal 456 may cover the entire upper surface of a package P. This allows the testing unit to be used to perform a burst test. In other embodiments where the seal 456 does not cover the entire porous surface of a package, the test may be conducted as described further below in order to assess flow rates.

In another embodiment, depicted in FIG. 4B, the sealing structure 400A may be removable and refillable ink tank 502 having two apertures for the needles 252, 254 to pass therethrough. Seals 504 disposed on the bottom surface thereof contact a package surface on extension and as depicted in the appendix, may mark the package with ink as a wetted stamp, to create a visual indicator that the packages have been tested.

To perform a flow rate test on a porous package, the needles 252 and 254 pierce the top surface of the package P inside a sealed area. A known volume and pressure of gas are injected into the package through the "in needle" and the rate of gas flow out of the package through the "out needle" is then measured by the pressure transducer 208. Since the porous packaging material has a known, or expected, flow rate therethough, the difference between the inflow and outflow of gas through the needles can be used to determine whether the package exhibits variation from the expected rate to thereby determine seal integrity, for example if the package has a gap or opening that allows for an increased rate of flow.

One application for the system 10 is to characterize the integrity of a package being made of rigid, flexible, porous, or non-porous material. The apparatus 10 may be used to find holes in packaging material of a certain size that are not of a torturous path in the packaging material. The apparatus 10 may then be used to characterize the seal strength between two materials by relating the burst pressure of the package to the seal strength of the package, following the initial test. The apparatus is meant to be either mounted directly on a form/fill/seal machine as an inline test or on a bench-top mounting system. The apparatus may be utilized as a development device for characterizing machine sealing parameters either "off-line" or "in-line".

As depicted, the apparatus uses a pneumatic air supply, a pneumatic air cylinder, and a pneumatic solenoid valve to drive a puncture assembly into packaging web. It will be appreciated that the linear actuator may be mechanical rather than pneumatic, if desired. The puncture assembly may employ one needle or a series of needles that connect to a pneumatic airline for pressurizing the package, a transducer (208, FIG. 2A) for converting the physical internal pressure of the package into an analog signal, an electronically controlled pneumatic pressure regulator for controlling the pressure into the package, a pneumatic proportional solenoid valve for controlling the flow into the package, and an electronic pneumatic flow sensor for monitoring the pneumatic flow into and/or out the package using the signal from the transducer. The analog signal may be captured by a Programmable Logic Control ("PLC") unit, or similar device, and converted into a digital pressure which is presented to the operator by a Human Machine Interface unit, or similar device. The needle entry point is sealed by a soft non-permeable material that surrounds the needle and is attached to the puncture assembly unit. This "sealing" layer may encompass the porous packaging material so that the porosity of the package diminishes to a negligible value, as with FIG. 4A. The sealing layer may also be comprised of a permeable material which is saturated with a solution, as in FIG. 4B. The solution may be of a certain desired viscosity that is complementary of the porosity of the material in which it is infused. The solution may be infused with a pigment which acts as a marking agent for "tested packages". All electronic parts of the apparatus may be controlled by a PLC unit that employs certain algorithms to control the unit as a whole. Multiple testing units may be combined in a fashion that allows for concurrent testing of multiple packages.

The process for testing each package entails the puncturing of the package with the two needles followed by a procedure which varies the flow of pressurized air to one of the two puncture needles. This allows for pressurized air to flow into the package from the "in needle" and out of the package through the "out needle". Once the pressurized air flows through the out needle, the volume is measured by an electronic pneumatic flow sensor and is then released to ambient air pressure. This value is captured by several data points and stored in the PLC for further calculation.

Once the "flow" data points have been collected, a second test may be initiated which entails sealing the "out needle" from ambient air pressure with a "three way" electronic solenoid valve, which is connected to a pneumatic pressure transducer. Another procedure is then executed which varies the flow of pressurized air to the "in needle" while concurrently collecting and storing a series of pressure sensor readings from the pneumatic pressure transducer.

Figure 5:
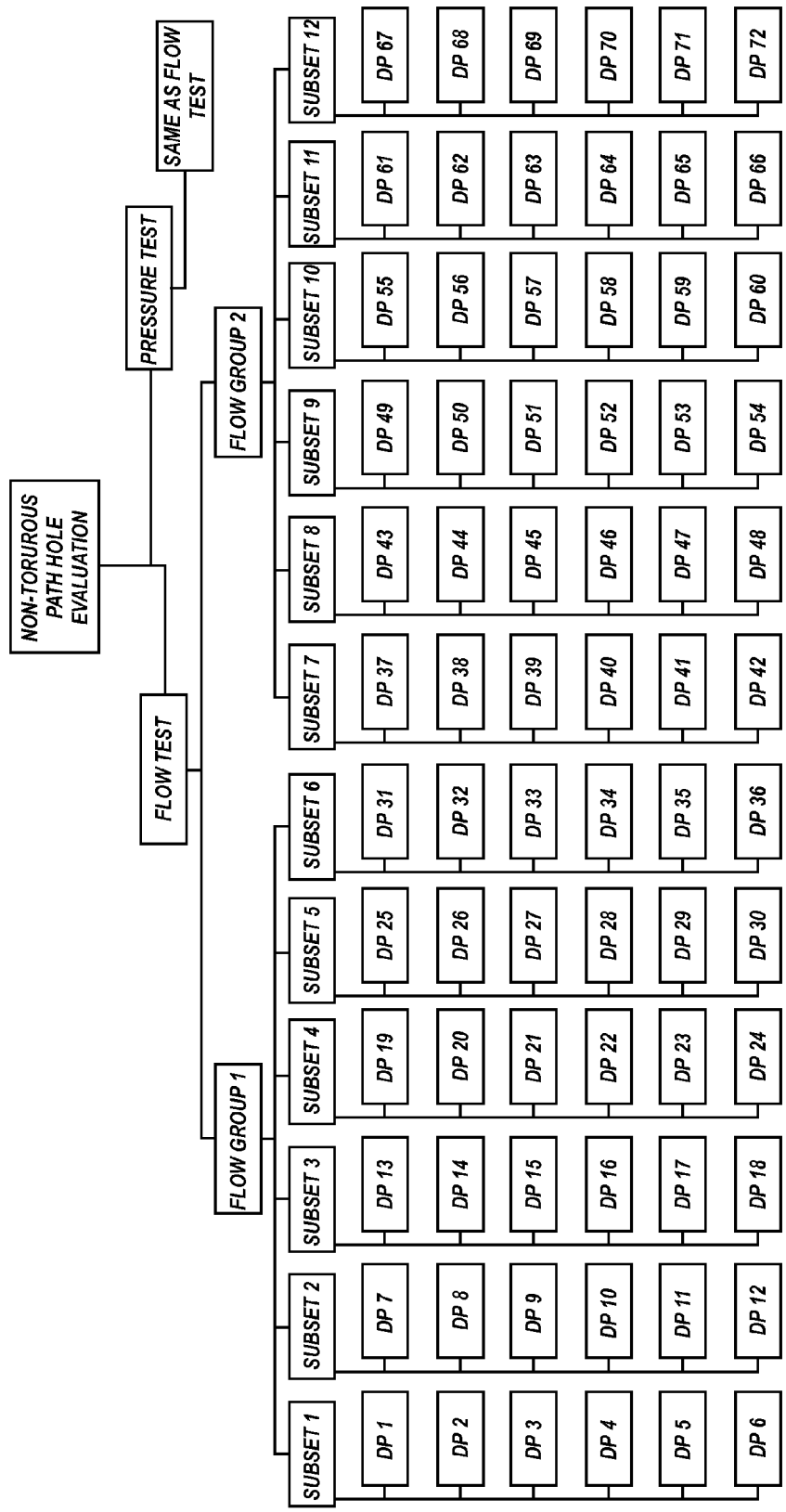
FIG. 5 is a Data Points Hierarchy Chart for conducting a Non-Torturous Path Hole Evaluation Test.

The "Non-Torturous Path Hole Evaluation Test is divided into two main tests, the "Flow Test" and the "Pressure Test", which are executed subsequently. Each main test may be broken into a number of specific data points, in one example 72 data points which are separated into 12 subsets may be used. The 12 subsets may then be divided in half leaving 2 groups. An average value for the six data points contained in each subset may then be calculated. An average value is then calculated for each group leaving one value for each group. The two values from each group may be mathematically manipulated to produce a higher statistically significant confidence in the test. Results for such a test are depicted in Table 1 and a Data Points Hierarchy Chart for conducting the test is presented in FIG. 5.

TABLE 1

TEST PARAMETERS FOR AUTO EVALUATION CYCLE, TEST PARAMETERS ARE IN PERCENTAGE OF VALVE ORIFACE OPENING

| | | CYCLE NUMBER | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| TEST NUMBER | 1 | 65 | 68 | 70 | 72 | 74 | 76 | 80 | 84 | 88 | 90 | 94 | 96 |
| | 2 | 72 | 74 | 76 | 78 | 80 | 82 | 74 | 76 | 78 | 80 | 84 | 88 |
| | 3 | 60 | 65 | 70 | 75 | 80 | 85 | 90 | 95 | 80 | 75 | 70 | 65 |
| | 4 | 100 | 90 | 80 | 70 | 60 | 50 | 70 | 72 | 74 | 76 | 78 | 80 |
| | 5 | 100 | 90 | 80 | 70 | 60 | 50 | 80 | 82 | 84 | 86 | 88 | 90 |
| | 6 | 100 | 90 | 80 | 70 | 60 | 50 | 90 | 92 | 94 | 96 | 98 | 100 |
| | 7 | 80 | 85 | 90 | 60 | 70 | 80 | 65 | 70 | 75 | 80 | 85 | 90 |
| | 8 | 70 | 71 | 72 | 73 | 74 | 75 | 85 | 86 | 87 | 88 | 89 | 90 |
| | 9 | 90 | 90 | 90 | 90 | 90 | 90 | 70 | 70 | 70 | 70 | 70 | 70 |
| | 10 | 80 | 80 | 80 | 80 | 80 | 80 | 80 | 80 | 80 | 80 | 80 | 80 |

Additionally, applicant notes that if tests of packages in accordance with the present invention are conducted in a solution, such as underwater, rather than in air, then the variability of the test results goes down dramatically. This is because the water acts as a weak seal by creating greater pressure outside the package. Essentially, it takes more force to break through the paper making it more porous. It also makes the paper fibers swell in paper webs which decreases the porosity.

While this invention has been described in certain embodiments, the present invention can be further modified with the spirit and scope of this disclosure. This application is therefore intended to cover any variations, uses, or adaptations of the invention using its general principles. Further, this application is intended to cover such departures from the present disclosure as come within known or customary practices in the art to which this invention pertains and which fall within the limits of the appended claims.

What is claimed is:

1. A method of testing the seal integrity on a package having at least one porous surface, the method comprising:
   piercing the package with at least a first injection needle and at least a first measuring needle;
   injecting a first quantity of a gas at a first rate into the package through the at least first injection needle;
   measuring gas flow through the at least first measuring needle; and
   comparing the measured gas flow through the at least first measuring needle to an expected value accounting for a loss of injected gas through the at least one porous surface of the package.

2. The method according to claim 1, wherein measuring the gas flow through the at least first measuring needle comprises measuring a volume of gas flowing through the at least first measuring needle and releasing the gas to ambient air pressure.

3. The method according to claim 1, wherein comparing the measured gas flow comprises taking multiple data points collected during gas flow measurement and calculating an average value for a number of data points to compare to the expected value.

4. The method according to claim 1, wherein, piercing the package with the at least first injection needle and at least first measuring needle comprises piercing the package through the at least one porous surface in an area that is sealed to prevent airflow therethrough.

5. The method according to claim 4, wherein piercing the package through the at least one porous surface in the area that is sealed to prevent airflow therethrough comprises sealing the area to present the airflow prior to piercing by contacting a seal to a portion of the at least one porous surface around the site to be pierced.

6. The method according to claim 5, wherein sealing the area comprises placing a layered sealing structure over the area through which the at least first injection needle and the at least first measuring needle can penetrate.

7. The method according to claim 5, wherein sealing the area comprises placing sealing structure including a wetted stamp as part of the seal on the area.

8. The method according to claim 1, wherein the at least first measuring needle is sealed from ambient air pressure and injecting a first quantity of gas comprises varying a flow of pressurized gas through the at least first injection needle.

9. The method according to claim 8, wherein the at least first measuring needle is sealed from ambient air pressure by a three way solenoid valve.

10. The method according to claim 8, wherein measuring a rate of gas flow through the at least first measuring needle comprises collecting a series of pressure sensor readings with a pressure sensor in communication with the at least first measuring needle.

11. The method according to claim 8, wherein comparing the measured gas flow through the at least first measuring needle to an expected value accounting for a loss of injected gas through the at least one porous surface of the package comprises taking the series of multiple pressure readings as a number of multiple data points and calculating average values using specific selected data points related to variances in the gas flow and then comparing the calculated averages to expected values.

12. The method of claim 1, further comprising after measuring gas flow through the at least first measuring needle, sealing the at least first measuring needle from ambient air pressure and performing a burst test by continuing to inject gas into the package until it bursts while measuring the pressure required to burst the package.

13. The method of claim 12, further comprising adjusting sealing parameters on a Form/Fill/Seal machine which produced the package in accordance with a control loop based on the measured burst test pressure.

14. The method of claim 12, further comprising sealing the at least one porous surface of the package by contacting a seal to the package that covers the entirety of the at least one porous surface.

15. The method of claim 1, further comprising testing the seal integrity of a selected package in-line following its production by a Form/Fill/Seal system.

* * * * *